UNITED STATES PATENT OFFICE.

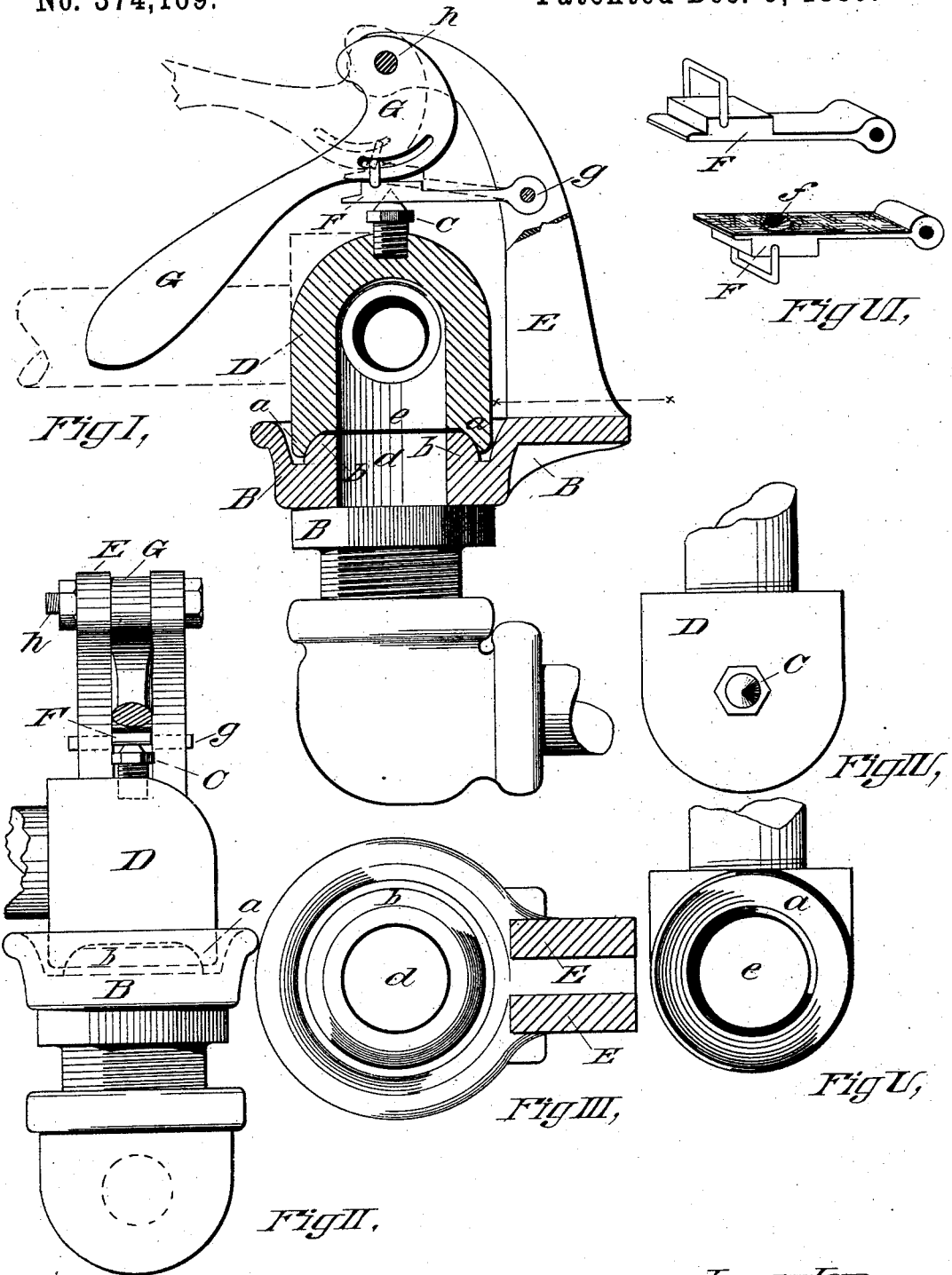

SIDNEY H. BARRETT, OF SPRINGFIELD, MASSACHUSETTS, ASSIGNOR TO R. F. HAWKINS, TRUSTEE, OF SAME PLACE.

PIPE-COUPLING.

SPECIFICATION forming part of Letters Patent No. 374,169, dated December 6, 1887.

Application filed July 1, 1887. Serial No. 243,097. (No model.)

*To all whom it may concern:*

Be it known that I, SIDNEY H. BARRETT, a citizen of the United States, residing at Springfield, Hampden county, State of Massachusetts, have invented a new and useful Improvement in Pipe-Couplings, of which the following is a specification.

My improvements relate to the class of couplings more especially adapted to be combined with the ends of steam-pipes, and have for their object a tighter joint, a larger latitude of movement of one section upon the other, an automatic adjustment of the joint-surfaces upon each other to compensate for wear, and an automatic breaking of the joint in certain contingencies to permit the escape of the steam; and my invention consists in the combination and construction, as hereinafter described, and more fully and particularly pointed out in the claims.

The invention is fully illustrated in the accompanying drawings, in which—

Figure I is a partial sectional elevation of a pipe-coupling embodying my improvements. Fig. II is a partial sectional elevation at right angles to the position shown in Fig. I. Fig. III is a partial section showing a plan view of one part of the coupling. Fig. IV is a top plan view of the other part of the coupling. Fig. V is a plan view in reverse of Fig. IV, and Fig. VI are views in perspective of a detail.

This device, though applicable to pipe ends intended to remain stationary, as in the case of those employed in buildings and in other situations where a forcibly-held joint is essential, is especially adapted to the ends of steam-pipes between railroad-cars, where a rapid coupling is desirable and where a latitude of movement requires to be provided to permit the pipe ends to adjust themselves to the swaying of the cars in motion.

B is one pipe end, having an annular seat, $b$, surrounding the orifice $d$ therein, and in a plane at right angles to the axis of said orifice.

D is the other pipe end, having a seat, $a$, at right angles to its orifice $e$, and conforming to the seat $b$ as a reverse counterpart.

C is a conical center secured to the outside of end D, and arranged therewith to be coincident with an axis to the annular seat $a$.

E is a support fixed to end B, extending therefrom above the end D, and affording hinges to a cam-block, F, and cam-lever G.

F is a cam-block provided on its under face with a conical socket, $f$, arranged to swing over the center C as the cam-block is swung upon its hinge $g$ in the support E; and G is a cam-lever hinged at $h$ to the support E, to have its cam bear the block F upon the center C and hold it there.

To couple the pipe ends B D, the conforming faces $b\, a$ are brought together, the block F is swung to rest upon the center C, with its point within the conical socket $f$, and the lever G is swung by its handle to have the cam end bear upon the block F to force the point of the center C to the apex of socket $f$, and so center the part D upon its seat while forcibly holding it thereto. The bearing-surface of the cam, when locking the block F to the center C is to one side of a line between the center C and hinge $h$, so that the cam cannot release itself, while by simply swinging it up the block F is released and the ends D B are free to be separated. It will be seen that the two pipe ends so held together are free to rotate with the faces $a\, b$ in close contact, and that any resulting wear is evenly distributed, so that the contour of said faces in cross-section remains unchanged.

By threading the shank of center C, as shown, and screwing it into the end D, it may be adjusted, as the faces $a\, b$ are worn, to always be perpendicular to said faces when centered in the socket $f$.

The faces $a\, b$ are preferably the segment of a circle, as shown, so as to form, in effect, a ball-and-socket joint, which, together with the cone-socket $f$, enables the end D to be placed upon the one B with only so much care as insures the point of center C coming somewhere within the mouth of socket $f$, as the action of the cam-lever G causes said point to follow upon the inclined sides of the socket, to thereby automatically bring the perimeters of the faces $a\, b$ in the same or parallel planes, and so save much time in coupling, which would otherwise be required in a preliminary adjustment.

The corresponding faces $a\, b$ are formed, as seen in Fig. I, preferably so as to have a full bearing upon their curved surfaces, with space for wear, and so as to form a tight joint with the center C slightly out of perpendicular with the plane of the annular face $b$, as might be the case from inadvertence in adjusting center C to a wear of the two surfaces $a\ b$.

In place of the socket $f$ being formed in the cam-block F and the center C being upon the end D, their relative positions may be reversed, and also, without a departure from the principle of my invention, the convexity of the face $b$ and concavity of the one $a$ may be reversed.

In Fig. I the pipe from end D is shown in dotted lines swung nearly at right angles, and the handle of lever G is extended, when its cam is operative, to couple the pipe ends, so as to be in the path of said pipe were its movement in the same direction continued. In such case the pipe intersecting the lever-handle would force it up, and so release the pipe end D to the extent of permitting the steam to escape between the faces $a\ b$, which automatic breaking of the joint is of advantage in case of derailment of adjoining railroad-cars.

In practice I form the block F and center C of hardened steel, which reduces the friction at the center and also the wear to the minimum.

Now, having described my invention, what I claim is—

1. The within-described coupling for pipe ends, consisting of two pipe ends, D B, having corresponding annular faces forming a steam-tight joint when held together and socketed one within the other to prevent lateral displacement, a support, E, fixed to the end B, a cam-block, F, arranged to be brought over end D, a cam-lever, G, hinged to support E and arranged to have its cam swung against cam-block F, and a socket and center in the cam-block and end D, arranged to be brought together and held by the cam-lever, substantially as shown, to join the faces of the two ends and form a center of revolution for the end D in a line perpendicular to the plane of its annular face $a$, all combined and operating as and for the purpose set forth.

2. Two pipe ends, D B, faced correspondingly to form a ball-and-socket joint, a support, E, fixed to the end B, a cam-lever, G, hinged to the support E to have its cam swing over the end D, a cam-block, F, tied to the support E and arranged to extend in the path of the cam and over the end D, and a center and socket therefor, combined with the cam-block F and end D, and arranged to be held by the cam to seat the end D and form a center of revolution coincident with the axis of its joint-face, as and for the purpose set forth.

3. The combination, with jointed pipe ends D B, support E, cam-block F, center C, socket $f$, and cam-lever G, all combined and operating as described, of a cam-lever handle arranged, when the lever is in an operative position, to intersect the path of the pipe from end D at an angle, causing the continued contact of said pipe in motion to swing the lever, for the purpose set forth.

SIDNEY H. BARRETT.

Witnesses:
D. HOLLAND,
R. F. HYDE.